United States Patent
Tang et al.

(10) Patent No.: US 10,511,418 B2
(45) Date of Patent: Dec. 17, 2019

(54) MEASUREMENT METHOD IN CARRIER AGGREGATION AND ASYNCHRONOUS DUAL CONNECTIVITY

(71) Applicant: INTEL IP CORPORATION, Santa Clara, CA (US)

(72) Inventors: Yang Tang, Pleasanton, CA (US); Rui Huang, Beijing (CN)

(73) Assignee: Intel IP Corporation, Santa Clara, CA (US)

(*) Notice: Subject to any disclaimer, the term of this patent is extended or adjusted under 35 U.S.C. 154(b) by 0 days.

(21) Appl. No.: 15/565,674

(22) PCT Filed: Apr. 15, 2016

(86) PCT No.: PCT/US2016/027951
§ 371 (c)(1),
(2) Date: Oct. 10, 2017

(87) PCT Pub. No.: WO2016/182692
PCT Pub. Date: Nov. 17, 2016

(65) Prior Publication Data
US 2018/0083748 A1 Mar. 22, 2018

Related U.S. Application Data

(60) Provisional application No. 62/161,765, filed on May 14, 2015.

(51) Int. Cl.
*H04W 80/04* (2009.01)
*H04L 5/00* (2006.01)
(Continued)

(52) U.S. Cl.
CPC ............ *H04L 5/0032* (2013.01); *H04L 5/001* (2013.01); *H04L 5/0082* (2013.01);
(Continued)

(58) Field of Classification Search
CPC ..... H04L 5/0032; H04L 5/001; H04L 5/0082; H04W 56/001; H04W 72/02; H04W 24/10
(Continued)

(56) References Cited

U.S. PATENT DOCUMENTS

2012/0307670 A1* 12/2012 Kazmi ............... H04W 24/10
370/252
2014/0341192 A1* 11/2014 Venkob ............... H04W 24/00
370/336
(Continued)

FOREIGN PATENT DOCUMENTS

EP 2385723 A1 11/2011

OTHER PUBLICATIONS

International Search Report and Written Opinion dated Jun. 22, 2016, from International Application No. PCT/US2016/027951, 17 pages.
(Continued)

*Primary Examiner* — Sai Ming Chan
(74) *Attorney, Agent, or Firm* — Schwabe, Williamson & Wyatt, P.C.

(57) ABSTRACT

An apparatus of a base station, comprising: a controller to configure a first measurement gap pattern with a first measurement gap repetition period (MGRP) for a first receive (Rx) chain of a user equipment (UE); and configure a second measurement gap pattern with a second measurement gap repetition period (MGRP) for a second receive (Rx) chain of the UE, wherein the first MGRP is different from the second MGRP. The apparatus may configure the measurement gap patterns to support carrier aggregation and/or dual connectivity.

23 Claims, 7 Drawing Sheets

(51) Int. Cl.
*H04W 56/00* (2009.01)
*H04W 72/02* (2009.01)
*H04W 24/10* (2009.01)

(52) U.S. Cl.
CPC ......... *H04W 56/001* (2013.01); *H04W 72/02* (2013.01); *H04W 24/10* (2013.01)

(58) Field of Classification Search
USPC ........................................................ 370/330
See application file for complete search history.

(56) References Cited

U.S. PATENT DOCUMENTS

| | | | |
|---|---|---|---|
| 2016/0014706 A1* | 1/2016 | Vajapeyam | H04W 56/001 370/328 |
| 2016/0073366 A1* | 3/2016 | Ng | H04W 56/001 370/329 |
| 2016/0088534 A1* | 3/2016 | Axmon | H04W 36/0083 370/252 |
| 2016/0295583 A1* | 10/2016 | Kazmi | H04W 24/08 |

OTHER PUBLICATIONS

CATT, "Measurement Gap Issues for Dual Connectivity," 3GPP TSG RAN WG2 Meeting #85bis, R2-141558, Agenda Item: 7.1.3, Mar. 31-Apr. 4, 2014, Valencia, Spain, 5 pages.
European Patent Office—Article 94(3) dated Oct. 9, 2018 from European Patent Application No. 16720254.8, 7 pages.
Intel Corporation, "RRM measurement for dual connectivity," 3GPP TSG RAN WG2 Meeting #87, R2-143188, Agenda item: 7.1.3.2, Aug. 18-22, 2014, Dresden, Germany, 5 pages.

\* cited by examiner

MEASUREMENT METHOD IN CARRIER AGGREGATION AND ASYNCHRONOUS DUAL CONNECTIVITY

CROSS REFERENCE TO RELATED APPLICATIONS

The present application is a national phase entry under 35 U.S.C. § 371 of International Application No. PCT/US2016/027951, filed 15 Apr. 2016, entitled "MEASUREMENT METHOD IN CARRIER AGGREGATION AND ASYNCHRONOUS DUAL CONNECTIVITY", which designates the United States of America, which claims the benefit of U.S. Provisional Patent Application No. 62/161,765, filed on 14 May 2015, the entire specifications of which are hereby incorporated by reference in their entireties for all purposes, except for those sections, if any, that are inconsistent with this specification.

BACKGROUND

Wireless mobile communication technology uses various standards and protocols to provide telecommunication services to fixed or mobile subscribers, e.g., a base station and a wireless mobile device. In the third generation partnership project (3GPP) long term evolution (LTE) systems, a base station may be an evolved Node Bs (eNode Bs or eNBs) that may communicate with the wireless mobile device, known as a user equipment (UE).

BRIEF DESCRIPTION OF THE DRAWINGS

The disclosure described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. Aspects, features and advantages of embodiments of the present disclosure will become apparent from the following description of the disclosure in reference to the appended drawing in which like numerals denote like elements and in which.

Figure 1:
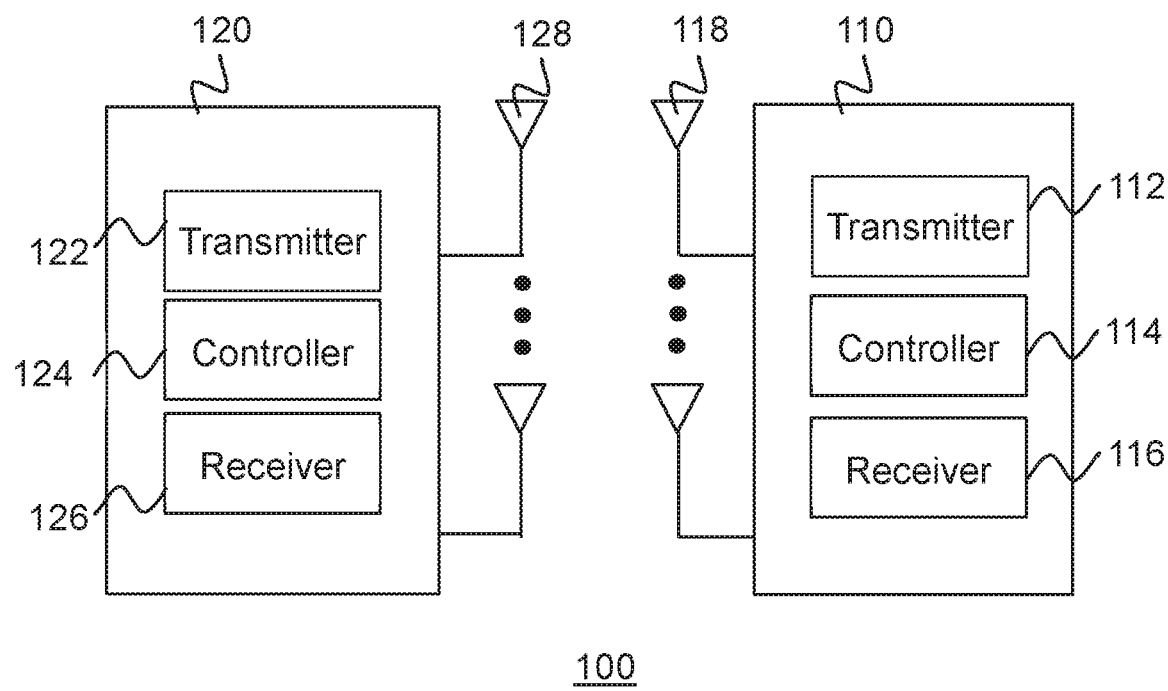
FIG. 1 schematically illustrates a block diagram of an example wireless network in accordance with various embodiments.

Reference will now be made to the exemplary embodiments illustrated, and specific language will be used herein to describe the same. It will nevertheless be understood that no limitation of the scope of the disclosure is thereby intended.

DETAILED DESCRIPTION

Before the present disclosure is disclosed and described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device, a mobile device, a smartphone, etc.). For example, a non-transitory machine-readable medium may include read only memory (ROM); random access memory (RAM); magnetic disk storage media; optical storage media; flash memory devices. For another example, a transitory machine-readable medium may include electrical, optical, acoustical or other forms of propagated signals (e.g., carrier waves, infrared signals, digital signals, etc.), and others.

The following description may include terms, such as first, second, etc. that are used for descriptive purposes only and are not to be construed as limiting. As used herein, the term "module" and/or "unit" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Further, various operations will be described as multiple discrete operations, in turn, in a manner that is most helpful in understanding the illustrative embodiments; however, the order of description should not be construed as to imply that these operations are necessarily order dependent. In particular, these operations may not need to be performed in the order of presentation.

The following embodiments may be used in a variety of applications including transmitters and receivers of a radio system, although the present disclosure is not limited in this respect. Examples of radio systems may include, but are not limited to, network interface cards (NICs), network adaptors, fixed or mobile client devices, relays, base stations, femtocells, gateways, bridges, hubs, routers, access points, or other network devices. Further, the radio systems within the scope of the disclosure may be implemented in cellular radiotelephone systems, satellite systems, two-way radio systems as well as computing devices including such radio systems, e.g., personal computers, tablets and related peripherals, personal digital assistants, personal computing accessories, hand-held communication devices and all systems which may be related in nature and to which the principles of the inventive embodiments could be suitably applied.

In third generation partnership project (3GPP) radio access network (RAN) long term evolution (LTE) systems, a transmission station may comprise a combination of an evolved universal terrestrial radio access network (E-UTRAN) Node Bs (also commonly denoted as evolved Node Bs, enhanced Node Bs, eNodeBs, or eNBs), which may communicate with a wireless mobile device, known as a user equipment (UE). A downlink transmission may comprise a communication from the transmission station (or eNodeB) to the wireless mobile device (or UE), and an uplink transmission may comprise a communication from the wireless mobile device to the transmission station.

Some embodiments may be used in conjunction with various devices and/or systems, for example, a UE, a mobile device, a mobile wireless device, a mobile communication device, a wireless station, a mobile station, a personal computer, a desktop computer, a mobile computer, a laptop computer, a netbook computer, a notebook computer, a tablet computer, a smartphone device, a mobile phone, a cellular phone, a server computer, a handheld computer, a handheld mobile device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wireless node, a base station (BS), a wired or wireless router, a wired or wireless modem, a video device, an audio device, an audio-video (A/V) device, a wired or wireless network, a wireless area network, a cellular network, a cellular node, a cellular device, a wireless local area network (WLAN) device, an universal integrated circuit card (UICC), an ultra mobile PC (UMPC), a customer premise equipment (CPE), a multiple input multiple output (MIMO) transceiver or device, a device having one or more internal antennas and/or external antennas, a digital video broadcast (DVB) device, a multi-standard radio device, a wired or wireless handheld device, a wireless application protocol (WAP) device, vending machines, sell terminals, a wearable device, a handset, and/or other consumer electronics such as MP3 players, digital cameras and the like, personal computing accessories and existing and future arising wireless mobile devices which may be related in nature and to which the principles of the embodiments could be suitably applied.

FIG. 1 schematically illustrates a wireless communication network 100 in accordance with various embodiments. In one embodiment, wireless communication network 100 (hereinafter "network 100") may comprise a base station 110, e.g., an evolved Node B (eNB), that may communicate with a mobile wireless device, e.g., UE 120. In various embodiments, eNB 110 may be a fixed station (e.g., a fixed node) or a mobile station/node. In various embodiments, the network 100 may comprise an access network of an access network of a 3GPP LTE network such as E-UTRAN, 3GPP LTE-A network, 4G network, 4.5G network, a 5G network or any other future communication network, a WiMax cellular network, HSPA, Bluetooth, WiFi or other type of wireless access networks or any other future standards.

In various embodiments, eNB 110 and/or UE 120 may support multiple-input and multiple-output (MIMO) communication with each other. For example, eNB 110 and/or UE 120 may comprise one or more antennas to utilize one or more radio resources of the wireless communication network 100. As shown in FIG. 1, eNB 110 and/or UE 120 may each comprise a set of one or more antennas to implement a multiple-input-multiple-output (MIMO) transmission/reception system. The MIMO transmission/reception system may operate in a variety of MIMO modes, including single-user MIMO (SU-MIMO), multi-user MIMO (MU-MIMO), close loop MIMO, open loop MIMO, full-dimension MIMO (FD-MIMO) or variations of smart antenna processing. As shown in FIG. 1, eNB 110 may comprise one or more antennas 118 while UE 120 may comprise one or more antennas 128.

In some demonstrative embodiments, eNB 110 may include a controller 114. The controller 114 may be coupled with a transmitter 112 and a receiver 116 and/or one or more communications modules or units in eNB 110. In some embodiments, the transmitter 112 and/or the receiver 116 may be elements or modules of a transceiver. The transmitter 112 and/or the receiver 116 may be coupled with the one or more antennas 118 to communicate with UE 120. UE 120 may comprise a transmitter 122 and a receiver 126 and/or one or more communications modules or units. The transmitter 122 and/or the receiver 126 may communicate with a base station (BS), e.g., eNB 110 or other type of wireless access point such as wide area network (WWAN) via one or more antennas 128 of the UE 120.

In some embodiments, eNB 110 may comprise other hardware, software and/or firmware components, e.g., a memory, a storage, an input module, an output module, one or more radio modules and/or one or more digital modules, and/or other components. Transmitter 112 may be configured to transmit signals to UE 120 via one or more antennas 118. Receiver 116 may be configured to receive signals from UE 120 via one or more antennas 118. In some embodiments, the transmitter 112 and/or the receiver 116 may be elements or modules of a transceiver circuitry.

In some embodiments, controller 114 may control one or more functionalities of eNB 110 and/or control one or more communications performed by eNB 110. In some demonstrative embodiments, controller 114 may execute instructions of software and/or firmware, e.g., of an operating system (OS) of eNB 110 and/or of one or more applications. Controller 114 may comprise or may be implemented using suitable circuitry, e.g., controller circuitry, configuration circuitry, baseband circuitry, scheduler circuitry, processor circuitry, memory circuitry, and/or any other circuitry, which may be configured to perform at least part of the functionality of controller 114. In some embodiments, one or more functionalities of controller 114 may be implemented by logic, which may be executed by a machine and/or one or more processors.

In various embodiments, UE 120 may communicate using one or more wireless communication standards including 3GPP LTE, worldwide interoperability for microwave access (WiMAX), high speed packet access (HSPA), Bluetooth, WiFi, 5G standard and/or other wireless standards or future wireless standards. UE 120 may communicate via separate antenna(s) for each wireless communication standard or shared antenna(s) for multiple wireless communication standards. In some embodiments, UE 120 may communicate in a wireless local area network (WLAN), a wireless personal area network (WPAN), and/or a wireless wide area network (WWAN) or other network.

In some embodiments, UE 120 may comprise a controller 124, a transmitter 122, a receiver 124 and one or more antennas 128. In some embodiments, UE 120 may comprise other hardware components, software components and/or firmware components, e.g., a memory, a storage, an input unit, an output unit and/or any other components. Transmitter 122 may transmit signals to eNB 110 via one or more antennas 128. Receiver 124 may receive signals from eNB 110 via one or more antennas 128. In some embodiments, the transmitter 122 and/or the receiver 126 may be elements or modules of a transceiver.

In some embodiments, controller 124 may be coupled to receiver 124 and transmitter 122. In some embodiments, controller 124 may control one or more functionalities of UE 120 and/or control one or more communications performed by UE 120. In some demonstrative embodiments, controller 124 may execute instructions of software and/or firmware, e.g., of an operating system (OS) of UE 120 and/or of one or more applications. Controller 124 may comprise or may be implemented using suitable circuitry, e.g., controller circuitry, scheduler circuitry, processor circuitry, memory circuitry, and/or any other circuitry, which may be configured to perform at least part of the functionality of controller 12. In some embodiments, one or more functionalities of controller 124 may be implemented by logic, which may be executed by a machine and/or one or more processors.

For example, controller 124 may comprise a central processing unit (CPU), a digital signal processor (DSP), a graphic processing unit (GPU), one or more processor cores, a single-core processor, a dual-core processor, a multiple-core processor, a microprocessor, a host processor, a controller, a plurality of processors or controllers, a chip, a microchip, one or more circuits, circuitry, a baseband circuitry, a configuration circuitry, a radio frequency (RF) circuitry, a logic unit, an integrated circuit (IC), an application-specific IC (ASIC), or any other suitable multi-purpose or specific processor or controller and/or any combination thereof.

Transmitter 112 may comprise, or may be coupled with one or more antennas 118 of eNB 110 to communicate wirelessly with other components of the wireless communication network 100, e.g., UE 120. Transmitter 122 may comprise, or may be coupled with one or more antennas 128 of UE 120 to communicate wirelessly with other components of the wireless communication network 100, e.g., eNB 110. In some embodiments, transmitter 112 and/or transmitter 122 may each comprise one or more transmitters, one or more receivers, one or more transmitters, one or more receivers and/or one or more transceivers that may send and/or receive wireless communication signals, radio frequency (RF) signals, frames, blocks, transmission streams, packets, messages, data items, data, information and/or any other signals.

In some demonstrative embodiments, the antennas 118 and/or the antennas 128 may comprise any type of antennas suitable to transmit and/or receive wireless communication signals, RF signals, blocks, frames, transmission streams, packets, messages, data items and/or data. For example, the antennas 118 and/or the antennas 128 may comprise any suitable configuration, structure and/or arrangement of one or more antenna elements, components, units, assemblies and/or arrays. In some embodiments, the antennas 118 and/or the antennas 128 may implement transmit and/or receive functionalities using separate transmit and/or receive antenna elements. In some embodiments, the antennas 118 and/or the antennas 128 may implement transmit and/or receive functionalities using common and/or integrated transmit/receive elements. The antenna may comprise, for example, a phased array antenna, a single element antenna, a dipole antenna, a set of switched beam antennas, and/or the like.

While FIG. 1 illustrates some components of eNB 110, in some embodiments, the eNB 110 may optionally comprise other suitable hardware, software and/or firmware components that may be interconnected or operably associated with one or more components in the eNB 110. While FIG. 1 illustrates some components of UE 120, in some embodiments, UE 120 may comprise other suitable hardware, software and/or firmware components that may be interconnected or operably associated with one or more components in UE 120. For example, eNB 110 and/or UE 120 may comprise one or more radio modules (not shown) to modulate and/or demodulate signals transmitted or received on an air interface, and one or more digital modules (not shown) to process signals transmitted and received on the air interface.

In some demonstrative embodiments, eNB 110 and/or UE 120 may comprise one or more input units (not shown) and/or one or more output units (not shown). For example, one or more input units may comprise a keyboard, a keypad, a mouse, a touch-screen, a touch-pad, a track-ball, a stylus, a microphone, or any other pointing/input unit or device. For example, one or more output units may comprise a monitor, a screen, a touch-screen, a flat panel display, a Cathode Ray Tube (CRT) display unit, a Liquid Crystal Display (LCD) display unit, a plasma display unit, one or more audio speakers or earphones, or any other output unit or device.

In some demonstrative embodiments, UE 120 may comprise, for example, a mobile computer, a mobile device, a station, a laptop computing device, a notebook computing device, a netbook, a tablet computing device, an Ultrabook™ computing device, a handheld computing device, a handheld device, a storage device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a mobile phone, a cellular telephone, a PCS device, a mobile or portable GPS device, a DVB device, a wearable device, a relatively small computing device, a non-desktop computer, a "carry small live large" (CSLL) device, an ultra mobile device (UMD), an ultra mobile PC (UMPC), a mobile internet device (MID), an "Origami" device or computing device, a video device, an audio device, an audio/video (A/V) device, a gaming device, a media player, a smartphone, a mobile station (MS), a mobile wireless device, a mobile communication device, a handset, a cellular phone, a mobile phone, a personal computer (PC), a handheld mobile device, an universal integrated circuit card (UICC), a customer premise equipment (CPE), or other consumer electronics such as digital cameras and the like, personal computing accessories and existing and future arising wireless mobile devices which may be related in nature and to which the principles of the embodiments could be suitably applied.

While FIG. 1 illustrates one or more components in eNB 110 and/or UE 120, eNB 110 and/or UE 120 may each comprise one or more radio modules or units (not shown) that may modulate and/or demodulate signals transmitted or received on an air interface, and/or one or more digital modules or units (not shown) that may process signals transmitted and received on the air interface.

Figure 2:
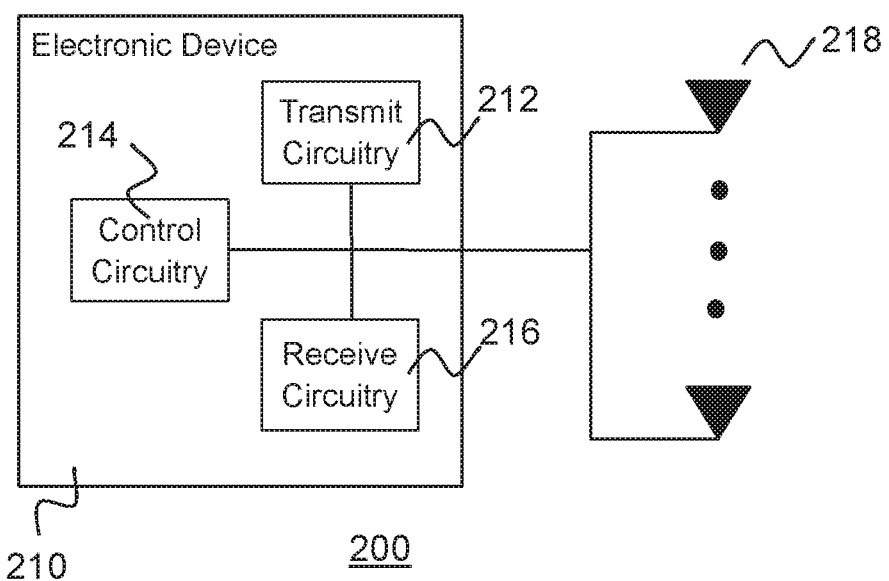
FIG. 2 illustrates a schematic block diagram relating to a structure of an uplink physical channel in accordance with various embodiments.

FIG. 2 illustrates an example of an electronic device circuitry 200 according to an embodiment. The electronic device circuitry 200 may be eNB circuitry, UE circuitry, or other type of circuitry in accordance with various embodiments. For example, the electronic device circuitry 200 may communicate using one or more wireless communication standards such as 3GPP LTE, WiMAX, HSPA, Bluetooth, WiFi, 5G standards or other wireless communication in various embodiments. The electronic device circuitry 200 may communicate in a wireless local area network (WLAN), a wireless personal area network (WPAN), and/or a wireless wide area network (WWAN) or other network in various embodiments.

In various embodiments, the electronic device circuitry 200 may be, or may be incorporated into or otherwise a part of, an eNB, a UE, or other type of electronic device. The electronic device circuitry 200 may comprise transmit circuitry 212 and receive circuitry 216 coupled to control circuitry 214. In some embodiments, the transmit circuitry 212 and/or receive circuitry 216 may be elements or modules of a transceiver circuitry. The electronic device circuitry 200 may be coupled with one or more plurality of antenna elements of one or more antennas 218. The electronic device circuitry 200 and/or the components of the electronic device circuitry 200 may be configured to perform operations similar to those described herein.

In some demonstrative embodiments, the electronic device circuitry 200 may be part of or comprise an application specific integrated circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry 200 may be implemented in, or functions associated with the circuitry may be implemented by, one or more software or firmware modules.

In some embodiments, control circuitry 214 may be coupled to transmit circuitry 212 and/or receive circuitry 216. In some embodiments, control circuitry 214 may control one or more functionalities and one or more communications of electronic device circuitry 200. In some demonstrative embodiments, control circuitry 214 may execute instructions of software and/or firmware, e.g., of an operating system (OS) and/or one or more applications of the electronic device circuitry 200. Control circuitry 214 may comprise or may be implemented using suitable circuitry, e.g., controller circuitry, scheduler circuitry, processor circuitry, memory circuitry, and/or any other circuitry, which may be configured to perform at least part of the functionality of the control circuitry 214. In some embodiments, one or more functionalities of control circuitry 214 may be implemented by logic, which may be executed by a machine and/or one or more processors.

In some embodiments, control circuitry 214 may comprise a central processing unit (CPU), a digital signal processor (DSP), a graphic processing unit (GPU), one or more processor cores, a single-core processor, a dual-core processor, a multiple-core processor, a microprocessor, a host processor, a controller, a plurality of processors or controllers, a chip, a microchip, a baseband circuitry, a radio frequency (RF) circuitry, a logic unit, an integrated circuit (IC), an application-specific IC (ASIC), or any other suitable or specific processor or controller, or one or more circuits or circuitry, and/or any combination thereof.

Figure 3:
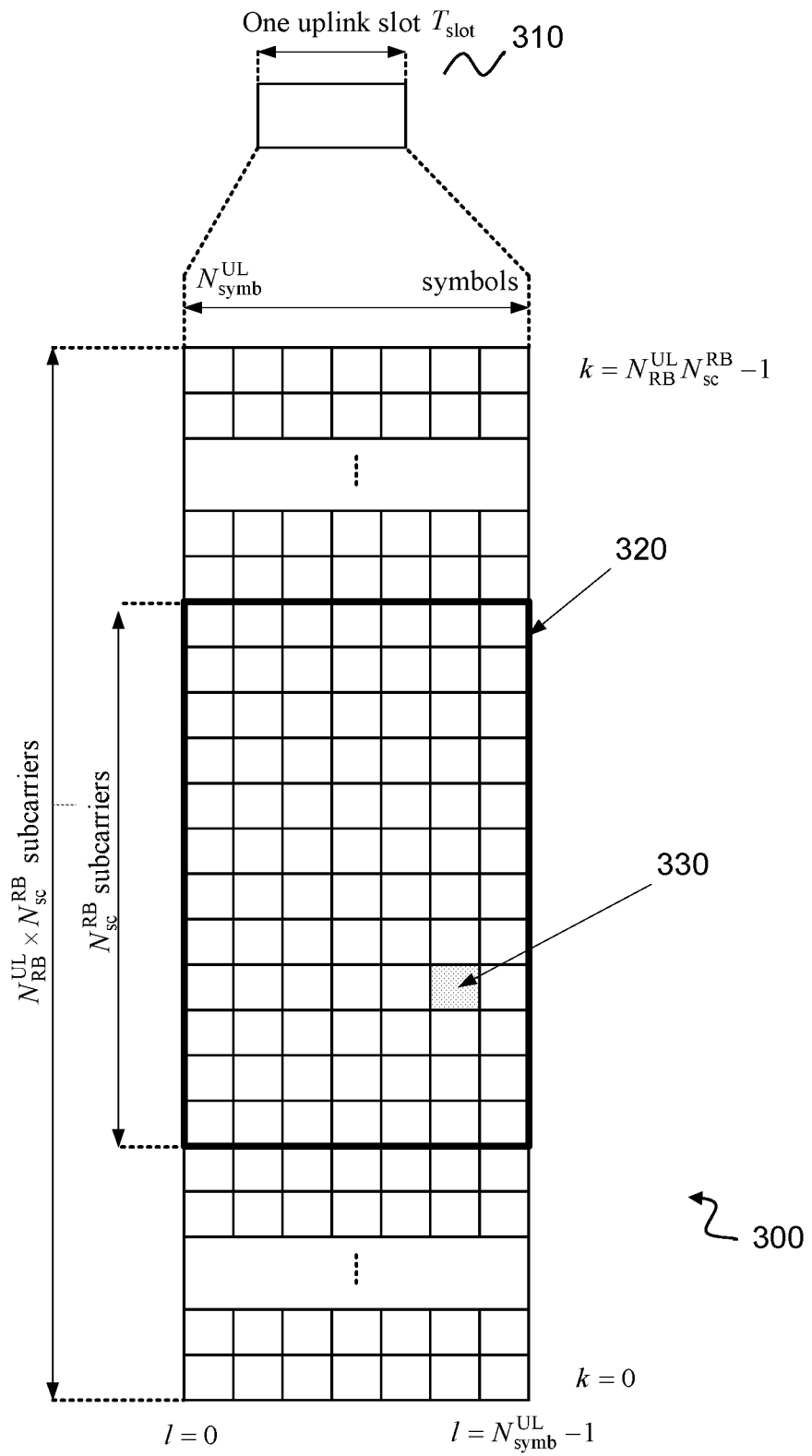
FIG. 3 schematically illustrates a diagram of an uplink resource grid in accordance with various embodiments.

FIG. 3 illustrates a diagram of an uplink resource grid structure according to an embodiment. A signal transmitted in a slot may be described by a resource grid 300 of $N_{RB}^{UL}N_{sc}^{UL}$ subcarriers and $N_{symb}^{UL}$ single-carrier frequency division multiple access (SC-FDMA) symbols, wherein $N_{RB}^{UL}$ may represent uplink transmission bandwidth configured in a cell, e.g., a number of resource blocks in the slot, $N_{sc}^{UL}$ may represent a number of subcarriers in the slot, and $N_{symb}^{UL}$ may represent a number of SC-FDMA symbols in the slot. While FIG. 3 illustrate a radio frame with a duration $T_f$, of, e.g., 10 milliseconds (ms), in some embodiments, a radio frame may have a different duration. A radio frame may be segmented or divided into one or more subframes that may each have a duration of, e.g., 1 ms. A subframe may be further subdivided into two slots, each with a duration $T_{slot}$ of, e.g., 0.5 ms. FIG. 3 illustrates an example of an uplink slot 310 with a duration of $T_{slot}$.

In various embodiments, uplink transmissions may be scheduled in larger units such as resource blocks 320. For example, a physical resource block 320 may comprise a number $N_{symb}^{UL}$ of SC-FDMA symbols in time domain and a number $N_{sc}^{RB}$ of subcarriers in frequency domain. In some embodiments, a physical resource block 320 may comprise, e.g., 12-15 kHz subcarriers and, e.g., 7 SC-FDMA symbols per subcarrier, e.g., for short or normal cyclic prefix. In another embodiment, a resource block 320 may use six SC-FDMA symbols for an extended cyclic prefix. In some other embodiments, a resource block 320 may comprise a different number of subcarriers or symbols.

In various embodiments, an element in a resource grid 300 may be called as a resource element 330. A resource element 330 may be a smallest resource unit for uplink transmission. For carrier aggregation (CA), two or more component carriers (CCs) may be aggregated to support wider transmission bandwidths, e.g., up to 100 MHz. A UE may simultaneously receive or transmit on one or multiple CCs depending on its capabilities. For example, CA may be supported for contiguous and/or non-contiguous CCs.

In some embodiments, a slot for a component carrier (CC) used by an eNode B or a UE may include one or more resource blocks (RBs) 320 based on the CC frequency bandwidth. For example, a resource block 320 in the uplink may comprise $N_{symb}^{UL} \times N_{sc}^{RB}$ REs 330 that may correspond to a slot, e.g, 0.5 ms in the time domain and, e.g., 180 kHz in the frequency domain. For example, the resource block 320 may be mapped to, e.g., 84 REs (REs) 330 using short or normal cyclic prefixing or, e.g., 72 REs (not shown) using extended cyclic prefixing. In some embodiments, a RB 320 may include, e.g., 12-15 kHz subcarriers (on the frequency axis) and, e.g., 6 or 7 orthogonal frequency-division multiplexing (OFDM) symbols (on the time axis) per subcarrier. In some embodiment, the RB 320 may use, e.g., seven OFDM symbols if short or normal cyclic prefix is employed. In another embodiment, the RB may use, e.g., six OFDM symbols if an extended cyclic prefix is used.

In some embodiments, a resource block 320 may be mapped to a different number of REs. A resource element 330 may be identified by an index pair (k,l) in a slot, where $k=0, \ldots, N_{RB}^{DL}N_{sc}^{RB}-1$ is the index in the frequency and l=0, ..., $N_{symb}^{DL}-1$ is the index in the time domain. In some embodiments, a resource element 330 may transmit, e.g., two bits of information for QPSK. In some other embodiments, a number of one or more bits communicated per resource element 330 may depend on other types of modulation, e.g., BPSK, 16 16-QAM, 32-QAM, 64-QAM, 256-QAM, and/or other types of modulation.

Figure 4:
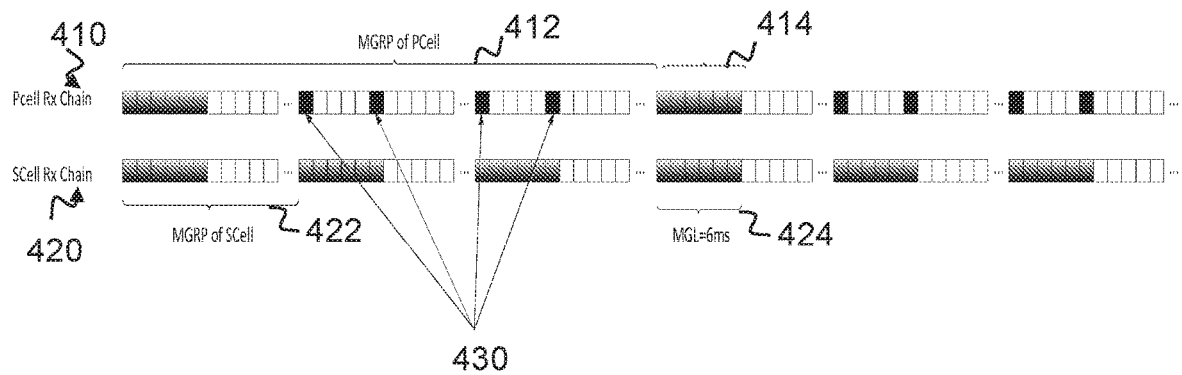
FIG. 4 schematically illustrates an example of a measurement gap pattern in accordance with various embodiments.

FIG. 4 schematically illustrates an example of a measurement gap pattern in accordance with some embodiments. In some demonstrative embodiments, the measurement gap pattern may be used for carrier aggregation (CA) and/or synchronous dual connectivity (DC).

In some embodiments, for carrier aggregation, a UE may have a RRC connection with a network. At RRC connection establishment and/or re-establishment and/or handover, a primary cell (PCell) may provide non-access stratum (NAS) mobility information, and at RRC connection re-establishment/handover, the PCell may provide a security input. In the downlink, the carrier corresponding to the PCell may be called downlink primary component carrier (DL PCC) and in the uplink it may be uplink primary component carrier (UL PCC).

Depending on UE capabilities, a set of serving cells, e.g., one or more secondary cells (SCells) may be configured to form together with the PCell. In the downlink, the carrier corresponding to a SCell is a downlink secondary component carrier (DL SCC) and in the uplink it is an uplink secondary component carrier (UL SCC).

For E-UTRAN that supports dual connectivity (DC) operation, a receive/transmission UE in RRC_CONNECTED may be configured to utilize radio resources provided by, e.g., two distinct schedulers in two eNBs that may be connected via a non-ideal backhaul over an X2 interface. An eNB in dual connectivity may act as a master eNB (MeNB) or a secondary eNB (SeNB). In dual connectivity, a UE may connected to a MeNB and a SeNB.

In some embodiments, for dual connectivity, a UE may be configured with a master cell group (MCG) that may comprise one or more serving cells of the MeNB and/or a secondary cell group that may comprise one or more serving cells of the SeNB.

In some embodiments, for a CA or DC capable UE, the UE may comprise one or more receive (Rx) chains that may operate independently. Data receiving and inter-frequency measurement(s) may share a same Rx chain. For example, in response to performing an inter-frequency measurement, the UE may send data on uplink and may stop receiving any data on downlink. The resources used for inter-frequency measurement and/or inter-RAT measurement may reduce data rate and scheduling opportunity of the UE.

In some embodiments, different Rx chains may have different loads of data to detect. For example, in a heterogeneous network (HetNet) that may include a layer of high power macro nodes (or macro-eNBs) overlaid with layers of lower power nodes (e.g., micro-eNBs, pico-eNBs, femto-eNBs, or home eNBs (HeNBs)) within the coverage area of the macro nodes, a Rx chain for an offloading layer may be busier than a Rx chain for a coverage layer. In LTE-A, some frequency carriers for small cells may be used for offloading purpose.

In some embodiments, a measurement gap may comprise a period that the UE may use to perform measurement(s). For example, the network may configure one or more measurement gap patterns for a receiving (Rx) chain of a UE. In some embodiments, a measurement gap pattern can be used to measure one or more frequencies. In some embodiments, the network may optimize one or more settings on different measurement gap patterns per frequency layer.

In some demonstrative embodiments, for a PCell Rx chain 410, the measurement gap pattern may comprise a measurement gap repetition period (MGRP) 412 that may comprise one or more PCell measurement gaps 414 with a measurement gap length (MGL), e.g., 6 ms. For example, a MGL may be the time from start of tuning to end of retuning, that may be aligned between a master cell group (MCG) and a secondary cell group (SCG) for a DC capable UE.

The MGRP 412 may further comprise one or more second measurement gaps 430 that may have a gap length shorter than that of the MGL 414. In some embodiments, the second measurement gap 430 may be a minimum measurement gap that may have a gap length of, e.g., 1 ms. The one or more shorter measurement gaps 430 may be used to align one or more UE measurements.

For a SCell Rx chain 420, the measurement gap pattern may comprise a MGRP 422 that may comprise one or more SCell measurement gaps 424 with a MGL, e.g., 6 ms. In some embodiments, the MGRP 422 of the Scell Rx chain 420 may be different from the MGRP 412 of the PCell Rx chain 410. For example, for CA or synchronous DC, if a measurement gap is configured for a PCell Rx chain 410 but not for the other Rx chain(s), e.g., SCell Rx chain 420, the short measurement gap, e.g., 430 may be used in the configured Rx chain for PCell Rx chain 410.

In some embodiments, a location of the one or more measurement gaps 430 in PCell Rx chain 410 may be aligned with the first subframe and/or the last subframe of the configured PCell measurement gap 414 for the PCell Rx chain 410.

While FIG. 4 may describe an example of short measurement gaps 430 in PCell measurement gaps 410, in some embodiments, one or more short measurement gaps 430 may be configured in the SCell 420 to align with the first subframe and/or the last subframe of the configured SCell measurement gap 424 for the SCell Rx chain 420. In some embodiments, the measurement gap pattern of FIG. 4 may allow or not allow an interruption (e.g., packet drop) for PCell and/or SCell.

Figure 5A:
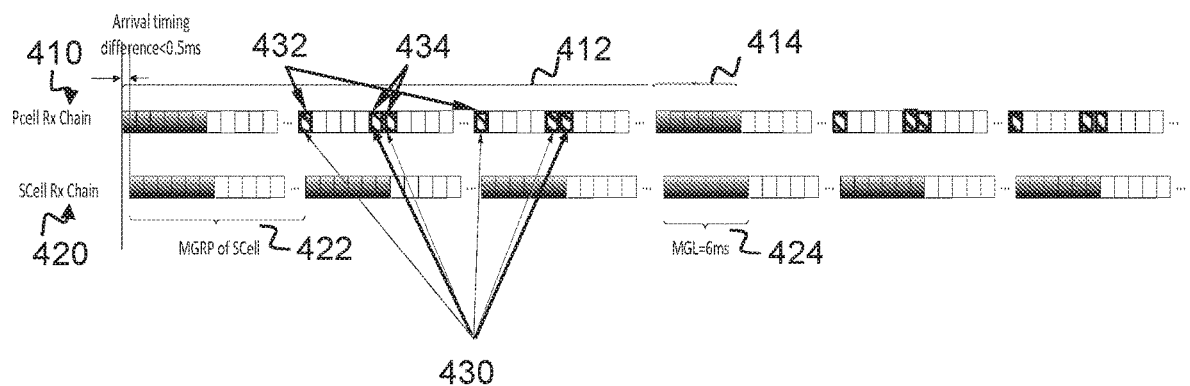
FIGS. 5A and 5B schematically illustrates examples of measurement gap patterns in accordance with various embodiments.
Figure 5B:
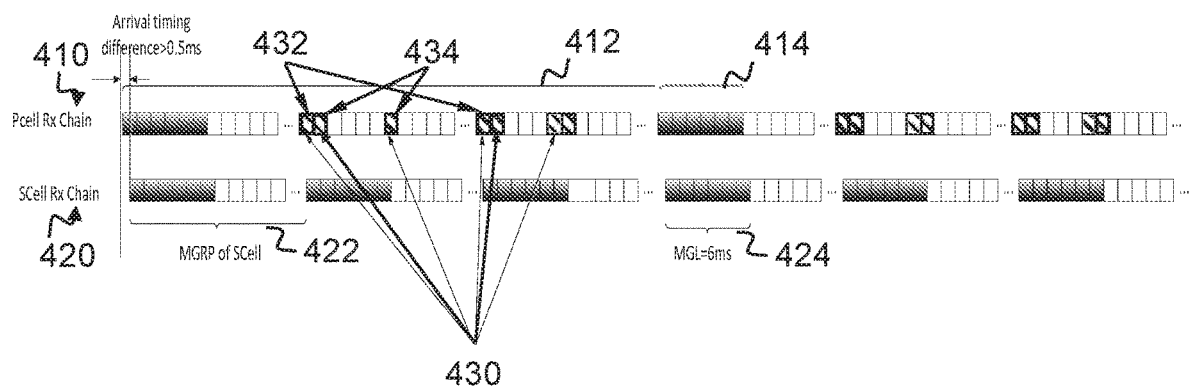

FIGS. 5A and 5B schematically illustrate examples of measurement gap patterns in accordance with some embodiments. In some embodiments, the measurement gap patterns as shown in FIGS. 5A and 5B may be used for asynchronous dual connectivity. For example, if a measurement gap is configured for a Rx chain but not for the other Rx chain(s), the short measurement gap, e.g., 430 may be used in the configured Rx chain.

For example, a 1 ms-length measurement gap 430 may be configured for a Rx chain, e.g., PCell Rx chain 410 of FIGS. 5A and 5B. The location of one or more of the measurement gaps 430 in a PCell Rx chain 410 may be determined based on, e.g., an arrival time difference between the PCell Rx chain 410 configured with the shorter measurement gaps 430 and the other Rx chain(s), e.g., SCell Rx chain 420 in FIGS. 5A and 5B.

In some demonstrative embodiments as shown in FIG. 5A, if the arrival time difference between the PCell Rx chain 410 configured with the shorter measurement gaps 430 and the SCell Rx chain 420 that may not be configured with the measurement gaps 430 is less than 500 us, a subframe 432 of PCell Rx chain 410 that is concurrent with a front boundary of the 6-ms measurement gap 424 of the SCell Rx chain 420 may be used as a shorter measurement gap 430. If an index of the one or more subframe 432 is represented by n, one or more subframes 434 with indices of n+5 and n+6 may be used as the shorter measurement gaps 430 for PCells.

In some demonstrative embodiments as shown in FIG. 5B, if the arrival timing different between the PCell Rx chain 410 configured with the measurement gaps 430 and the SCell Rx chain 420 is not less than 500 us, a subframe 432 of PCell Rx chain 410 that is correspondence with a front boundary of the 6-ms measurement gap 424 of the SCell Rx chain 420 may be used as the shorter measurement gap 430. If an index of the one or more subframe 432 is represented by n, one or more subframes 434 with indices of n+1 and n+6 may be used as the shorter measurement gaps 430 for PCells.

In some embodiments, the one or more measurement gaps 430 with a shorter gap length may be used to align measurement gaps of different Rx chains and avoid or reduce interruptions among the different Rx chains.

While FIGS. 5A and 5B illustrates embodiments of measurement gap pattern wherein one or more measurement gaps 430 of, e.g., 1 ms, may be used for PCell Rx chain 410, in some embodiments, the one or more measurement gaps 430 may be used in SCell Rx chain 420, if the one or more measurement gaps 430 may not be configured for PCell Rx chain 410.

Figure 6:
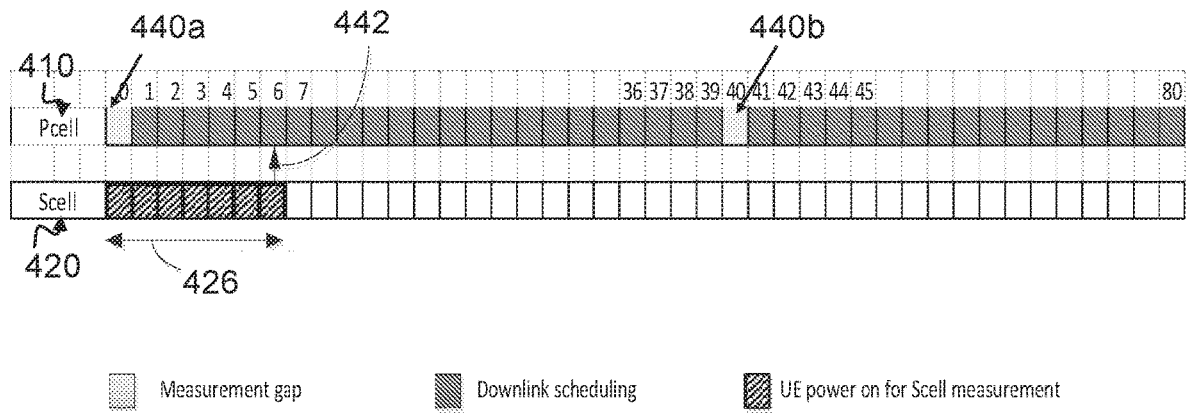
FIG. 6 schematically illustrates an example of a measurement gap pattern in accordance with various embodiments.

FIG. 6 schematically illustrates an example of measurement gap pattern in accordance with some embodiments. In some embodiments, the measurement gap pattern as shown in FIG. 6 may be used for a CA capable UE if one or more of the Rx chains are unused or deactivated.

In some embodiments, if one or more of the Rx chains 410 and/or 420 are unused, the unused or deactivated Rx chain may be used to perform measurement. In some embodiments, an Rx chain may comprise one or more controllers that may perform one or more functions of controller 124. A Rx chain may further comprise one or measurement circuitries or measurement units or measurement module that may be coupled to the one or more controllers to perform one or more of the measurements as described herein.

In some embodiments as shown in FIG. 6, in response to configuring an activated RX chain, e.g., PCell RX chain 410, a UE may determine a periodic measurement gap, e.g., 440a or 440b, with a periodicity of N ms, for the activated PCell Rx chain 410, if no measurement gap has been configured for the configured PCell Rx chain 410 and/or at least one of unused/deactivated Rx chain may be used for inter-frequency measurement. In some embodiments, the periodic measurement gap may be used to avoid interruptions, e.g., an additional interruption 442 to the PCell Rx chain 410 if UE may not complete Scell measurement within 6 ms (e.g., 426), or reduce an interruption rate to the PCell Rx chain 410.

The periodicity N for a periodic measurement gap 440a or 440b may have any integer value, e.g., more than 5. For example, as shown in FIG. 6, a periodic measurement gap 440a or 440b may be configured per 40 ms for the PCell Rx chain 410. In some embodiment, a periodic measurement gap 440a or 440b may have a gap length of, e.g., 1 ms.

In some embodiments, the SCell Rx chain 420 may be used to perform inter-frequency measurement. The unused or deactivated SCell Rx chain 420 may use a time duration of the 40 ms-interval to perform radio frequency (RF) re-tuning and/or adjust operating power.

In LTE, in case of CA, the network may configure a periodic measurement gap (e.g., 440) of the PCell Rx chain 410 as "CAlGapConfig=true" to configure a short measurement gap (e.g., 426) for SCell Rx chain 420 measurement.

For example, as shown in the gap configuration of FIG. 6, the first "N" subframes after a "gapOffset" in a measurement gap repetition period (e.g. 40 ms) may be scheduled for downlink transmission for PCell Rx chain 410. For example, in some embodiments as shown in FIG. 6, the "gapOffset" may indicate a first subframe of a periodic measurement gap 440a or 440b. In some embodiments, the measurement of SCell Rx chain 420 may be performed during one to all subframes after the PCell measurement gap 440a or 440b.

In some embodiments, the periodic measurement gap may be used to balance a load between data receiving and inter-frequency measurement. In some embodiments, an Rx chain may use the periodic measurement gap to align with a measurement gap of other Rx chains to avoid or reduce interruptions from each other. In some embodiments, the periodic measurement gap may be used to avoid or reduce an interruption for a Rx chain in, e.g., single radio frequency integrated circuit (RF-IC) implementation, if different Rx chains are configured with different measurement gap configurations. In some embodiments, UE may be more flexible to perform inter-frequency measurement for SCell to reduce a measurement delay, e.g., in a high speed scenario, and may reduce interruption rate.

Figure 7:
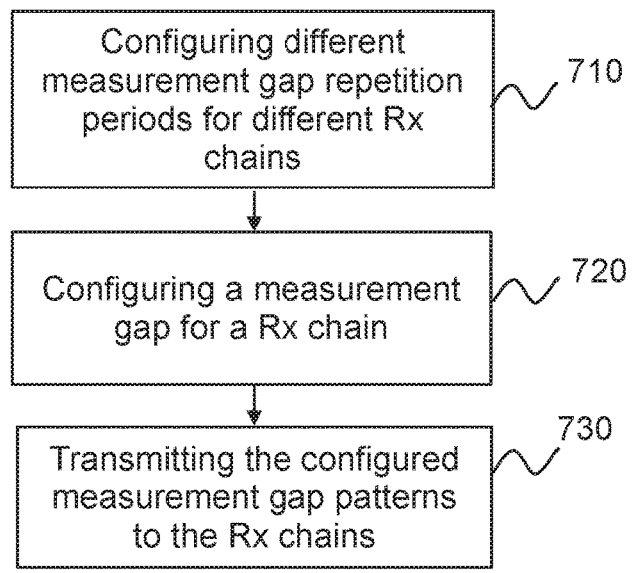
FIG. 7 schematically illustrates a flow chart of one or more processes in accordance with various embodiments.

FIG. 7 schematically illustrates a flow chart an example of one or more processes in accordance with one or more embodiments. For example, the processes of FIG. 7 may be used by, e.g., eNB 110 of FIG. 1. In some demonstrative embodiments, at 710, eNB 110 may configure, e.g., by control 114, a first measurement gap repetition period (MGRP) for a first Rx chain, e.g., PCell Rx chain 410 and may configure a second MGRP that may be different from the first MGRP, for a second Rx chain, e.g., SCell Rx chain 420, e.g., with reference to FIGS. 4, 5A, 5B and 6.

In some embodiments, at 720, controller 114 may configure one or more measurement gaps, e.g., 430, with a shorter measurement length for the first Rx chain, e.g., with reference to FIGS. 4, 5A, and 5B. In some embodiments, at 720, controller 114 may configure one or more periodic measurement gaps, e.g., 440, with a shorter measurement length for the first Rx chain, e.g., with reference to FIG. 6.

In some embodiments, at 730, controller 114 may transmit, via a transmitter 112, the configured gap patterns to the Rx chains. For example, one or more measurement information elements relating to the configured gap pattern may be transmitted to the Rx chains.

Figure 8:
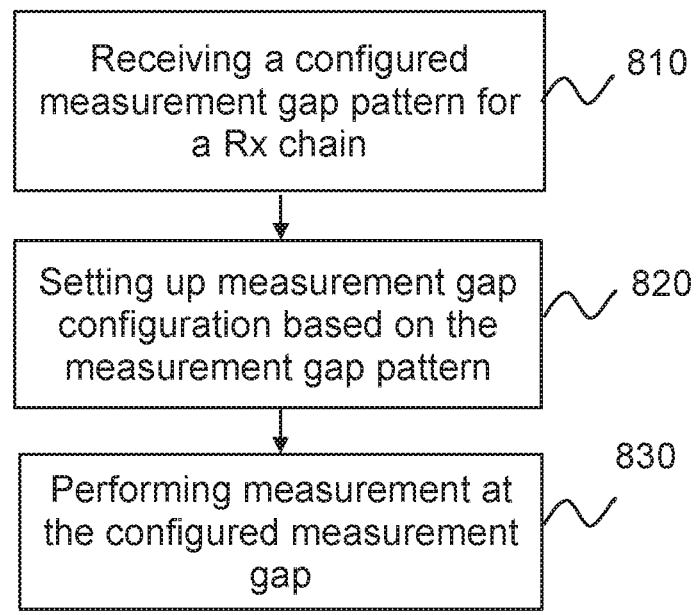
FIG. 8 schematically illustrates a flow chart of one or more processes in accordance with various embodiments.

FIG. 8 schematically illustrates a flow chart an example of one or more processes in accordance with one or more embodiments. For example, the processes of FIG. 8 may be used by, e.g., UE 120 of FIG. 1. In some demonstrative embodiments, at 810, control 124 of UE 120 may receive, via a transmitter 122, the configured gap patterns to one or more Rx chains of the UE. For example, one or more measurement information elements relating to the configured gap pattern may be transmitted to the Rx chains of the UE. A measurement information element may indicate first measurement gap repetition period (MGRP) for a first Rx chain, e.g., PCell Rx chain 410 and may configure a second MGRP that may be different from the first MGRP, for a second Rx chain, e.g., SCell Rx chain 420, e.g., with reference to FIGS. 4, 5A, 5B and 6. A measurement information element may comprise a gap offset that may relate to a subframe of a periodic measurement gap.

In some embodiments, at 820, controller 124 may set up one or more measurement gaps based on the received measurement gap patterns. For example, the controller 124 may set up one or more measurement gaps, e.g., 430, with a shorter measurement length for the first Rx chain, e.g., with reference to FIGS. 4, 5A, and 5B. In some embodiments, at 820, controller 114 may set up one or more periodic measurement gaps, e.g., 440, with a shorter measurement length for the first Rx chain, e.g., with reference to FIG. 6.

In some embodiments, at 830, controller 114 may perform one or more measurements at the one or more measurement gap based on one or more of the configured measurement gap patterns as shown in FIGS. 4, 5A, 5B and 6, for each Rx chain.

Figure 9:
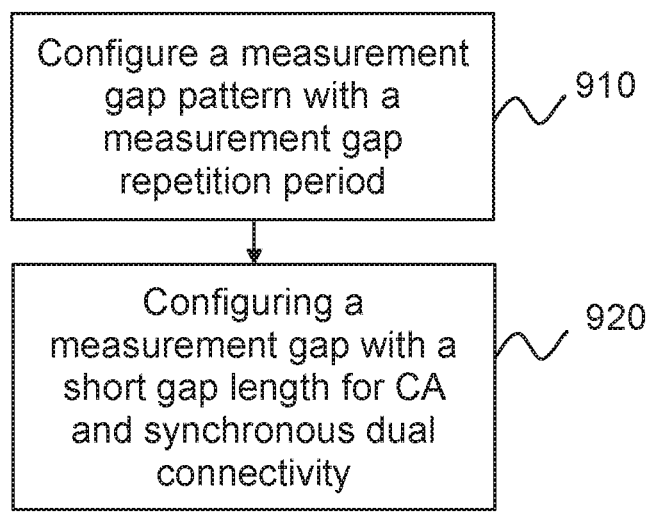
FIG. 9 schematically illustrates a flow chart of one or more processes in accordance with various embodiments.

FIG. 9 schematically illustrates a flow chart an example of one or more processes in accordance with one or more embodiments. For example, the processes of FIG. 9 may be used by, e.g., eNB 110 of FIG. 1. In some demonstrative embodiments, at 910, eNB 110 may configure, e.g., by control 114, different measurement gap patterns for different Rx chains of the UE 120. For example, a first measurement gap repetition period (MGRP) for a first Rx chain, e.g., PCell Rx chain 410 and may configure a second MGRP that may be different from the first MGRP, for a second Rx chain, e.g., SCell Rx chain 420, e.g., for a UE with reference to FIG. 4.

In some embodiments, at 920, controller 114 may configure one or more measurement gaps, e.g., 430, with a shorter measurement length for the first Rx chain, e.g., to support carrier aggregation and/or synchronous dual connectivity with reference to FIG. 4. In some embodiments, the controller 114 may determine a location of the one or more measurement gaps 430, e.g., as shown in FIG. 4.

In some embodiments, the UE 120, via controller 124 or one or more controllers in each Rx chain, may receive the one or more configured measurement gap patterns and perform measurement based on the one or more configured measurement gap patterns on each Rx chain.

Figure 10:
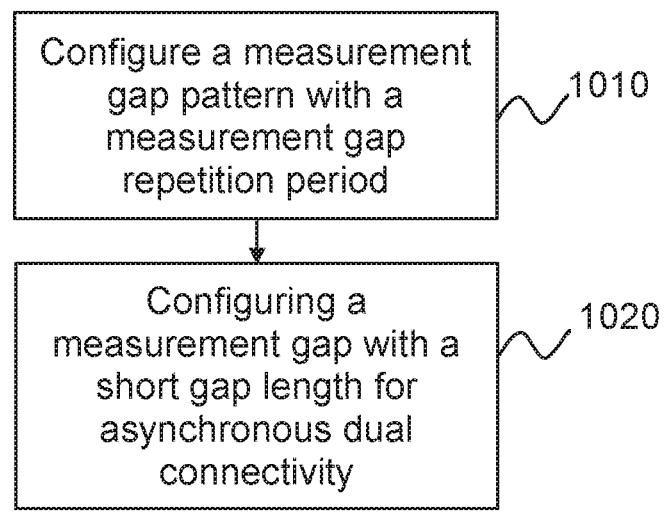
FIG. 10 schematically illustrates a flow chart of one or more processes in accordance with various embodiments.

FIG. 10 schematically illustrates a flow chart an example of one or more processes in accordance with one or more embodiments. For example, the processes of FIG. 10 may be used by, e.g., eNB 110 of FIG. 1. In some demonstrative embodiments, at 1010, eNB 110 may configure, e.g., by control 114, different measurement gap patterns for different Rx chains of the UE 120. For example, a first measurement gap repetition period (MGRP) for a first Rx chain, e.g., PCell Rx chain 410 and may configure a second MGRP that may be different from the first MGRP, for a second Rx chain, e.g., SCell Rx chain 420, e.g., for UE 120 with reference to FIGS. 5A and 5B.

In some embodiments, at 1020, controller 114 may configure one or more measurement gaps, e.g., 430, with a shorter measurement length for the first Rx chain, e.g., based on an arrival time difference between the PCell Rx chain 410 and SCell Rx chain 420 to support asynchronous dual connectivity with reference to FIGS. 5A and 5B. In some embodiments, the controller 114 may determine a location of the one or more measurement gaps 430, e.g., as shown in FIGS. 5A and 5B, respectively.

In some embodiments, the UE 120, via controller 124 or one or more controllers in each Rx chain, may receive the one or more configured measurement gap patterns to set up one or more measurement gaps for each Rx chain and perform measurement based on the one or more configured measurement gap patterns on each Rx chain.

Figure 11:
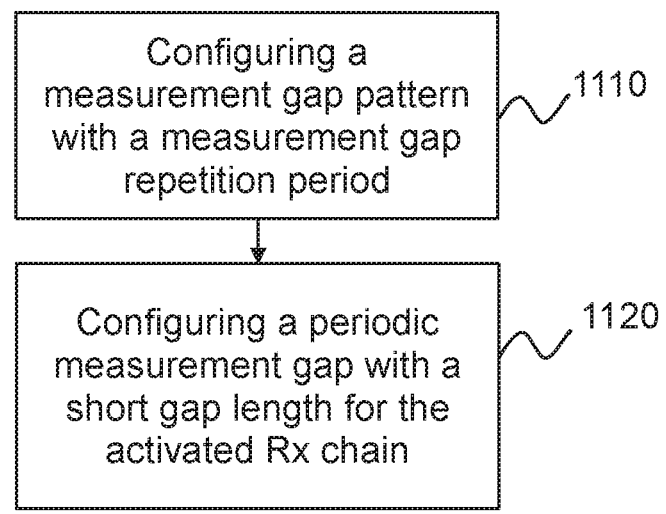
FIG. 11 schematically illustrates a flow chart of one or more processes in accordance with various embodiments.

FIG. 11 schematically illustrates a flow chart an example of one or more processes in accordance with one or more embodiments. For example, the processes of FIG. 11 may be used by, e.g., eNB 110 of FIG. 1. In some demonstrative embodiments, at 1110, eNB 110 may configure, e.g., by control 114, a measurement gap patterns with a measurement gap repetition period (MGRP) for an activated Rx chain, e.g., PCell Rx chain 410, e.g., for CA capable UE 120 with reference to FIG. 6.

In some embodiments, at 1120, controller 114 may configure one or more periodic measurement gaps, e.g., 440, with a shorter measurement length for the activated Rx chain, e.g., to support carrier aggregation with reference to FIG. 6. In some embodiments, the controller 114 may determine a location of the one or more periodic measurement gaps 440, e.g., based on a measurement delay, UE implementation flexibility and/or an interruption rate as shown in FIG. 6.

The controller 114 may further configure a measurement gap for measurement(s) on the unused or deactivated SCell Rx chain 420 based on a periodic measurement gap 440 of PCell Rx chain 410, e.g., as shown in FIG. 6. For example, the periodic measurement gap of PCell Rx chain 410 may be configured as "CAlgapConfig=True".

In some embodiments, the UE 120, via controller 124 or one or more controllers in the PCell Rx chain 410, may receive the configured measurement gap pattern to set up one or more periodic measurement gaps 440 for the PCell Rx chain 410. The controller 124 or one or more controllers in the SCell Rx chain 420 may to set up one or more measurement gaps for SCell Rx chain 420 measurement(s) based on the periodic measurement gaps 440 and may perform the measurement(s) based on the one or more setup measurement gaps. In some embodiments, the controller 124 or one or more controllers in the SCell Rx chain 420 may perform the measurement(s) during subframes after each periodic measurement gap 440. In some embodiments, controller 124 or one or more controllers in the PCell Rx chain 410 may schedule the first "N" subframes after a "gapOffset" in a measurement gap repetition period (e.g. 40 ms) for downlink transmission for PCell Rx chain 410. In some embodiments, as shown in FIG. 6, UE may be powered on for SCell Rx chain 420 measurement.

Figure 12:
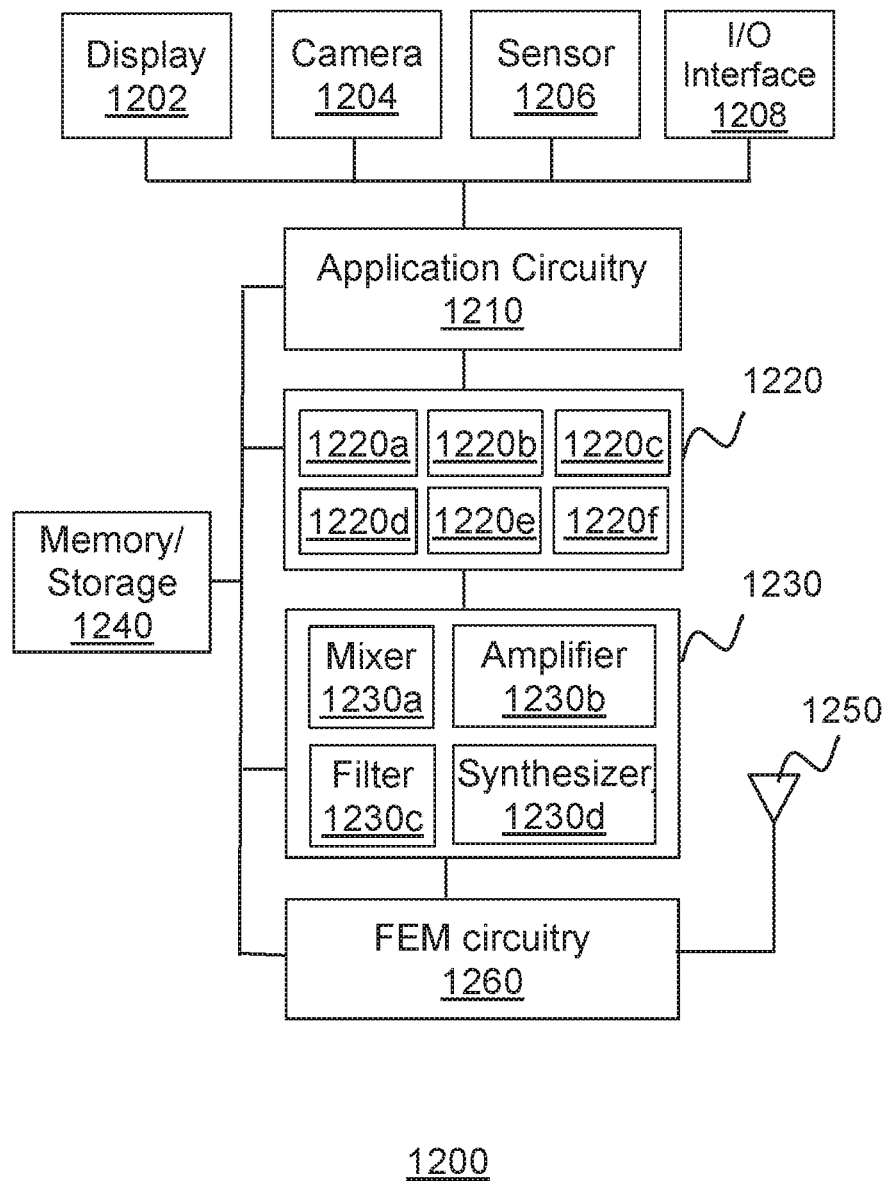
FIG. 12 illustrates an example of a block diagram of a mobile communication device in accordance with various embodiments.

Embodiments described herein may be implemented into a system using any suitably configured hardware, software and/or firmware. FIG. 12 illustrates, for one embodiment, an example system comprising radio frequency (RF) circuitry 1230, baseband circuitry 1220, application circuitry 1210, front end module (FEM) circuitry 1260, memory/storage 1240, one or more antennas 1250, display 1202, camera 1204, sensor 1206, and input/output (I/O) interface 1208, coupled with each other at least as shown. For one embodiment, FIG. 12 illustrates example components of a UE device 1200 in accordance with some embodiments.

The application circuitry 1210 may include one or more application processors. For example, the application circuitry 1210 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1220 may include circuitry such as, but not limited to, one or more single-core or multi-core processors. The baseband circuitry 1220 may include one or more baseband processors and/or control logic to process baseband signals received from a receive signal path of the RF circuitry 1230 and to generate baseband signals for a transmit signal path of the RF circuitry 1230. Baseband processing circuity 1220 may interface with the application circuitry 1210 for generation and processing of the baseband signals and for controlling operations of the RF circuitry 1230. For example, in some embodiments, the baseband circuitry 1220 may include a second generation (2G) baseband processor 1220a, a third generation (3G) baseband processor 1220b, a fourth generation (4G) baseband processor 1220c, and/or other baseband processor(s) 1220d for other existing generations, generations in development or to be developed in the future (e.g., fifth generation (5G), 6G, etc.). The baseband circuitry 1220 (e.g., one or more of baseband processors) may handle various radio control functions that enable communication with one or more radio networks via the RF circuitry 1230. The radio control functions may include, but are not limited to, signal modulation/demodulation, encoding/decoding, radio frequency shifting, etc. In some embodiments, modulation/demodulation circuitry of the baseband circuitry 1220 may include Fast-Fourier Transform (FFT), precoding, and/or constellation mapping/demapping functionality. In some embodiments, encoding/decoding circuitry of the baseband circuitry 1220 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1220 may include elements of a protocol stack such as, for example, elements of an EUTRAN protocol including, for example, physical (PHY), media access control (MAC), radio link control (RLC), packet data convergence protocol (PDCP), and/or RRC elements. A central processing unit (CPU) 1220e of the baseband circuitry 1220 may be configured to run elements of the protocol stack for signaling of the PHY, MAC, RLC, PDCP and/or RRC layers. In some embodiments, the baseband circuitry 1220 may include one or more audio digital signal processor(s) (DSP) 1220f that may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1220 and the application circuitry 1210 may be implemented together such as, for example, on a system on a chip (SOC).

In some embodiments, the baseband circuitry 1220 may provide for communication compatible with one or more radio technologies. For example, in some embodiments, the baseband circuitry 1220 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1220 is configured to support radio communications of more than one wireless protocol may be referred to as multi-mode baseband circuitry.

RF circuitry 1230 may enable communication with wireless networks using modulated electromagnetic radiation through a non-solid medium. In various embodiments, the RF circuitry 1230 may include switches, filters, amplifiers, etc. to facilitate the communication with the wireless network. RF circuitry 1230 may include a receive signal path which may include circuitry to down-convert RF signals received from the FEM circuitry 1260 and provide baseband signals to the baseband circuitry 1220. RF circuitry 1230 may also include a transmit signal path which may include circuitry to up-convert baseband signals provided by the baseband circuitry 1220 and provide RF output signals to the FEM circuitry 1260 for transmission.

In some embodiments, the RF circuitry 1230 may include a receive signal path and a transmit signal path. The receive signal path of the RF circuitry 1230 may include mixer circuitry 1230a, amplifier circuitry 1230b and/or filter circuitry 1230c. The transmit signal path of the RF circuitry 1230 may include filter circuitry 1230c and/or mixer circuitry 1230a.

RF circuitry 1230 may also include synthesizer circuitry 1230d for synthesizing a frequency for use by the mixer circuitry 1230a of the receive signal path and the transmit signal path. In some embodiments, the mixer circuitry 1230a of the receive signal path may be configured to down-convert RF signals received from the FEM circuitry 1260 based on the synthesized frequency provided by synthesizer circuitry 1230d.

The amplifier circuitry 1230b may be configured to amplify the down-converted signals. The filter circuitry 1230c may be a low-pass filter (LPF) or band-pass filter (BPF) configured to remove unwanted signals from the down-converted signals to generate output baseband signals. Output baseband signals may be provided to the baseband circuitry 1220 for further processing. In some embodiments, the output baseband signals may be zero-frequency baseband signals, although this is not a requirement. In some embodiments, mixer circuitry 1230a of the receive signal path may comprise passive mixers, although the scope of the embodiments is not limited in this respect.

In some embodiments, the mixer circuitry 1230a of the transmit signal path may be configured to up-convert input baseband signals based on the synthesized frequency provided by the synthesizer circuitry 1230d to generate RF output signals for the FEM circuitry 1260. The baseband signals may be provided by the baseband circuitry 1220 and may be filtered by filter circuitry 1230c. The filter circuitry 1230c may include a low-pass filter (LPF), although the scope of the embodiments is not limited in this respect.

In some embodiments, the mixer circuitry 1230a of the receive signal path and the mixer circuitry 1230a of the transmit signal path may include two or more mixers and may be arranged for quadrature downconversion and/or upconversion respectively. In some embodiments, the mixer circuitry 1230a of the receive signal path and the mixer circuitry 1230a of the transmit signal path may include two or more mixers and may be arranged for image rejection (e.g., Hartley image rejection). In some embodiments, the mixer circuitry 1230a of the receive signal path and the mixer circuitry 1230a may be arranged for direct downconversion and/or direct upconversion, respectively. In some embodiments, the mixer circuitry 1230a of the receive signal path and the mixer circuitry 1230a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1230 may include analog-to-digital converter (ADC) and digital-to-analog converter (DAC) circuitry and the baseband circuitry 1220 may include a digital baseband interface to communicate with the RF circuitry 1230.

In some dual-mode embodiments, a separate radio IC circuitry may be provided for processing signals for each spectrum, although the scope of the embodiments is not limited in this respect.

In some embodiments, the synthesizer circuitry 1230d may be a fractional-N synthesizer or a fractional N/N+1 synthesizer, although the scope of the embodiments is not limited in this respect as other types of frequency synthesizers may be suitable. For example, synthesizer circuitry 1230d may be a delta-sigma synthesizer, a frequency multiplier, or a synthesizer comprising a phase-locked loop with a frequency divider.

The synthesizer circuitry 1230d may be configured to synthesize an output frequency for use by the mixer circuitry 1230a of the RF circuitry 1230 based on a frequency input and a divider control input. In some embodiments, the synthesizer circuitry 1230d may be a fractional N/N+1 synthesizer.

In some embodiments, frequency input may be provided by a voltage controlled oscillator (VCO), although that is not a requirement. Divider control input may be provided by either the baseband circuitry 1220 or the applications processor 1210 depending on the desired output frequency. In some embodiments, a divider control input (e.g., X) may be determined from a look-up table based on a channel indicated by the applications processor 1210.

Synthesizer circuitry 1230d of the RF circuitry 1230 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1230d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1230 may include an IQ/polar converter.

FEM circuitry 1260 may include a receive signal path which may include circuitry configured to operate on RF signals received from one or more antennas 1250, amplify the received signals and provide the amplified versions of the received signals to the RF circuitry 1230 for further processing. FEM circuitry 1260 may also include a transmit signal path which may include circuitry configured to amplify signals for transmission provided by the RF circuitry 1230 for transmission by one or more of the one or more antennas 1250.

In some embodiments, the FEM circuitry 1260 may include a TX/RX switch to switch between transmit mode and receive mode operation.

The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1230). The transmit signal path of the FEM circuitry 1260 may include a power amplifier (PA) to amplify input RF signals (e.g., provided by RF circuitry 1230), and one or more filters to generate RF signals for subsequent transmission (e.g., by one or more of the one or more antennas 1250.

In some embodiments, the UE 1200 comprises a plurality of power saving mechanisms. If the UE 1200 is in an RRC_Connected state, where it is still connected to the eNB as it expects to receive traffic shortly, then it may enter a state known as Discontinuous Reception Mode (DRX) after a period of inactivity. During this state, the device may power down for brief intervals of time and thus save power.

If there is no data traffic activity for an extended period of time, then the UE 1200 may transition off to an RRC_Idle state, where it disconnects from the network and does not perform operations such as channel quality feedback, handover, etc. The UE 1200 goes into a very low power state and it performs paging where again it periodically wakes up to listen to the network and then powers down again. The device cannot receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

In various embodiments, transmit circuitry, control circuitry, and/or receive circuitry discussed or described herein may be embodied in whole or in part in one or more of the RF circuitry 1230, the baseband circuitry 1220, FEM circuitry 1260 and/or the application circuitry 1210. As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules or units.

In some embodiments, some or all of the constituent components of the baseband circuitry 1220, the application circuitry 1210, and/or the memory/storage may be implemented together on a system on a chip (SOC).

Memory/storage 1240 may be used to load and store data and/or instructions, for example, for system. Memory/storage 1240 for one embodiment may include any combination of suitable volatile memory (e.g., dynamic random access memory (DRAM)) and/or non-volatile memory (e.g., Flash memory).

In various embodiments, the I/O interface 1208 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, sensor may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 1202 may include a display (e.g., a liquid crystal display, a touch screen display, etc.).

In various embodiments, the system may be a mobile computing device such as, but not limited to, a laptop computing device, a tablet computing device, a netbook, an ultrabook, a smartphone, etc. In various embodiments, system may have more or less components, and/or different architectures.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules or units.

EXAMPLES

Example 1 may include a method, e.g., used by an eNB, comprising: configuring a first measurement gap pattern with a first measurement gap repetition period (MGRP) for a first receive (Rx) chain of a user equipment (UE); configuring a second measurement gap pattern with a second measurement gap repetition period (MGRP) for a second receive (Rx) chain of the UE, wherein the first MGRP is different from the second MGRP; and transmitting the first measurement gap pattern and the second measurement gap pattern to the UE.

Example 2 may include a method of Example 1 or some other example(s) herein, further comprising: configuring a first measurement gap of the first Rx chain to include a set of one or more gaps that each have a gap length shorter than that of the first measurement gap.

Example 3 may include a method of any one of Examples 1 or 2 or some other example(s) herein, further comprising: configuring a gap in the set of gaps to align with a first subframe of the first measurement gap.

Example 4 may include a method of any one of Examples 1 to 3, wherein a gap in the set of gap to align with a last subframe of the first measurement gap.

Example 5 may include a method of any one of Examples 1 to 4 or some other example(s) herein, further comprising: configuring a first measurement gap for the first Rx chain to include a set of one or more gaps based on an arrival time difference between the first Rx chain and the second Rx chain.

Example 6 may include a method of any one of Examples 1 to 5 or some other example(s) herein, further comprising: configuring a first gap in the set of gaps at a subframe of the first Rx chain, wherein the subframe is concurrent with a front boundary of a second measurement gap of the second Rx chain.

Example 7 may include a method of any one of Examples 1 to 6 or some other example(s) herein, further comprising: configuring a first gap in the set of gaps at a subframe of the first Rx chain, wherein the subframe is concurrent with a front boundary of a second measurement gap of the second Rx chain to support an asynchronous dual connectivity.

Example 8 may include a method of any one of Examples 1 to 7 or some other example(s) herein, further comprising: configuring a subsequent gap in the set of gaps in a subframe with an index of n+1 or a subframe with an index of n+5 of the first Rx chain, wherein n represents an index of the subframe for the first gap, in response to the arrival time difference is less than 500 us.

Example 9 may include a method of any one of Examples 1 to 8 or some other example(s) herein, further comprising: configuring a subsequent gap in the set of gaps in a subframe with an index of n+5 or a subframe with an index of n+6 of the first Rx chain, wherein n represents an index of the subframe for the first gap, in response to the arrival time difference is not less than 500 us.

Example 10 may include a method of any one of Examples 1 to 9 or some other example(s) herein, further comprising: configuring a periodic gap for the first Rx chain, wherein a periodicity of the periodic gap is N ms, wherein N to have a value more than 5.

Example 11 may include a method of any one of Examples 1 to 10 or some other example(s) herein, further comprising: configuring the periodic gap for the first Rx chain in response to the first Rx chain not having a measurement gap and the second Rx chain is used for inter-frequency measurement.

Example 12 may include a method of any one of Examples 1 to 11 or some other example(s) herein, further comprising: configuring a second measurement gap for the second Rx chain based on the periodic gap of the first Rx chain.

Example 13 may include a method of any one of Examples 1 to 12 or some other example(s) herein, further comprising: configuring the measurement of the second Rx chain in one or more subframes after the periodic measurement gap.

Example 14 may include a method, e.g., may be used by a user equipment, comprising: receiving a first measurement gap pattern with a first MGRP for a first receive (Rx) chain of the user equipment (UE) and a second measurement gap pattern with a second MGRP for a second receive (Rx) chain of the UE, wherein the first MGRP is different from the second MGRP; and setting up the first measurement gap based on the first measurement gap pattern and the first measurement gap based on the second measurement gap pattern.

Example 15 may include a method of Example 14 or some other example(s) herein, further comprising: setting up a first measurement gap of the first Rx chain to include a set of one or more gaps that each have a gap length shorter than that of the first measurement gap.

Example 16 may include a method of any one of Examples 14 and 15 or some other example(s) herein, further comprising: setting up a gap in the set of gap at a first subframe of the first measurement gap.

Example 17 may include a method of any one of Examples 14 to 16, wherein a gap in the set of gap to align with a last subframe of the first measurement gap.

Example 18 may include a method of any one of Examples 14 to 17 or some other example(s) herein, further comprising: setting up a first measurement gap for the first Rx chain to include a set of one or more gaps based on an arrival time difference between the first Rx chain and the second Rx chain.

Example 19 may include a method of any one of Examples 14 to 18 or some other example(s) herein, further comprising: setting up a first gap in the set of gaps at a subframe of the first Rx chain, wherein the subframe is concurrent with a front boundary of a second measurement gap of the second Rx chain.

Example 20 may include a method of any one of Examples 14 to 19 or some other example(s) herein, further comprising: setting up a first gap in the set of gaps at a subframe of the first Rx chain, wherein the subframe is concurrent with a front boundary of a second measurement gap of the second Rx chain to support an asynchronous dual connectivity.

Example 21 may include a method of any one of Examples 14 to 20 or some other example(s) herein, further comprising: setting up a subsequent gap in the set of gaps in a subframe with an index of n+1 or a subframe with an index of n+5 of the first Rx chain, wherein n represents an index of the subframe for the first gap, in response to the arrival time difference is less than 500 us.

Example 22 may include a method of any one of Examples 14 to 21 or some other example(s) herein, further comprising: setting up a subsequent gap in the set of gaps in a subframe with an index of n+5 or a subframe with an index of n+6 of the first Rx chain, wherein n represents an index of the subframe for the first gap, in response to the arrival time difference is not less than 500 us.

Example 23 may include a method of any one of Examples 14 to 22 or some other example(s) herein, further comprising: setting up a periodic gap for the first Rx chain, wherein a periodicity of the periodic gap is N ms, wherein N to have a value of 40.

Example 24 may include a method of any one of Examples 14 to 23 or some other example(s) herein, further comprising: setting up the periodic gap for the first Rx chain in response to the first Rx chain not having a measurement gap and the second Rx chain is used for inter-frequency measurement.

Example 25 may include a method of any one of Examples 14 to 24 or some other example(s) herein, further comprising: setting up a second measurement gap for the second Rx chain based on the periodic gap of the first Rx chain.

Example 26 may include a method of any one of Examples 14 to 25 or some other example(s) herein, further comprising: setting up the measurement of the second Rx chain in one or more subframes after the periodic measurement gap.

Example 27 may include a base station, comprising: a controller to: configure a first measurement gap pattern with a first measurement gap repetition period (MGRP) for a first receive (Rx) chain of a user equipment (UE); configure a second measurement gap pattern with a second measurement gap repetition period (MGRP) for a second receive (Rx) chain of the UE, wherein the first MGRP is different from the second MGRP; and a transmitter coupled to the controller, to transmit the first measurement gap pattern and the second measurement gap pattern to the UE.

Example 28 may include a base station of Example 27 or some other example(s) herein, wherein the controller is further to: configure a first measurement gap of the first Rx chain to include a set of one or more gaps that each have a gap length shorter than that of the first measurement gap.

Example 29 may include a base station of any one of Examples 27 and 28 or some other example(s) herein, wherein the controller is further to configure a gap in the set of gaps to align with a first subframe of the first measurement gap.

Example 30 may include a base station of any one of Examples 27 to 29, wherein a gap in the set of gap to align with a last subframe of the first measurement gap.

Example 31 may include a base station of any one of Examples 27 to 30 or some other example(s) herein, wherein the controller is further to configure a first measurement gap for the first Rx chain to include a set of one or more gaps based on an arrival time difference between the first Rx chain and the second Rx chain.

Example 32 may include a base station of any one of Examples 27 to 31 or some other example(s) herein, wherein the controller is further to configure a first gap in the set of gaps at a subframe of the first Rx chain, wherein the subframe is concurrent with a front boundary of a second measurement gap of the second Rx chain.

Example 33 may include a base station of any one of Examples 27 to 32 or some other example(s) herein, wherein the controller is further to configure a first gap in the set of gaps at a subframe of the first Rx chain, wherein the subframe is concurrent with a front boundary of a second measurement gap of the second Rx chain to support an asynchronous dual connectivity.

Example 34 may include a base station of any one of Examples 27 to 33 or some other example(s) herein, wherein the controller is further to configure a subsequent gap in the set of gaps in a subframe with an index of n+1 or a subframe with an index of n+5 of the first Rx chain, wherein n represents an index of the subframe for the first gap, in response to the arrival time difference is less than 500 us.

Example 35 may include a base station of any one of Examples 27 to 34 or some other example(s) herein, wherein the controller is further to configure a subsequent gap in the set of gaps in a subframe with an index of n+5 or a subframe with an index of n+6 of the first Rx chain, wherein n represents an index of the subframe for the first gap, in response to the arrival time difference is not less than 500 us.

Example 36 may include a base station of any one of Examples 27 to 35 or some other example(s) herein, wherein the controller is further to configure a periodic gap for the first Rx chain, wherein a periodicity of the periodic gap is N ms, wherein N to have a value more than 5.

Example 37 may include a base station of any one of Examples 27 to 36 or some other example(s) herein, wherein the controller is further to configure the periodic gap for the first Rx chain in response to the first Rx chain not having a measurement gap and the second Rx chain is used for inter-frequency measurement.

Example 38 may include a base station of any one of Examples 27 to 37 or some other example(s) herein, wherein the controller is further to configure a second measurement gap for the second Rx chain based on the periodic gap of the first Rx chain.

Example 39 may include a base station of any one of Examples 27 to 38 or some other example(s) herein, wherein the controller is further to configure the measurement of the second Rx chain in one or more subframes after the periodic measurement gap.

Example 40 may include a user equipment (UE), comprising: a receiver to receive a first measurement gap pattern with a first MGRP for a first receive (Rx) chain of the user equipment (UE) and a second measurement gap pattern with a second MGRP for a second receive (Rx) chain of the UE, wherein the first MGRP is different from the second MGRP; and a controller to set up the first measurement gap based on the first measurement gap pattern and the first measurement gap based on the second measurement gap pattern.

Example 41 may include a UE of Example 40 or some other example(s) herein, wherein the controller is further to set up a first measurement gap of the first Rx chain to include a set of one or more gaps that each have a gap length shorter than that of the first measurement gap.

Example 42 may include a UE of any one of Examples 40 and 41 or some other example(s) herein, wherein the controller is further to set up a gap in the set of gap at a first subframe of the first measurement gap.

Example 43 may include a UE of any one of Examples 40 to 42 or some other example(s) herein, wherein the controller is further to wherein a gap in the set of gap to align with a last subframe of the first measurement gap.

Example 44 may include a UE of any one of Examples 40 to 43 or some other example(s) herein, wherein the controller is further to set up a first measurement gap for the first Rx chain to include a set of one or more gaps based on an arrival time difference between the first Rx chain and the second Rx chain.

Example 45 may include a UE of any one of Examples 40 to 44 or some other example(s) herein, wherein the controller is further to set up a first gap in the set of gaps at a subframe of the first Rx chain, wherein the subframe is concurrent with a front boundary of a second measurement gap of the second Rx chain.

Example 46 may include a UE of any one of Examples 40 to 45 or some other example(s) herein, wherein the controller is further to set up a first gap in the set of gaps at a subframe of the first Rx chain, wherein the subframe is concurrent with a front boundary of a second measurement gap of the second Rx chain to support an asynchronous dual connectivity.

Example 47 may include a UE of any one of Examples 40 to 46 or some other example(s) herein, wherein the controller is further to set up a subsequent gap in the set of gaps in a subframe with an index of n+1 or a subframe with an index of n+5 of the first Rx chain, wherein n represents an index of the subframe for the first gap, in response to the arrival time difference is less than 500 us.

Example 45 may include a UE of any one of Examples 40 to 44 or some other example(s) herein, wherein the controller is further to set up a subsequent gap in the set of gaps in a subframe with an index of n+5 or a subframe with an index of n+6 of the first Rx chain, wherein n represents an index of the subframe for the first gap, in response to the arrival time difference is not less than 500 us.

Example 46 may include a UE of any one of Examples 40 to 45 or some other example(s) herein, wherein the controller is further to set up a periodic gap for the first Rx chain, wherein a periodicity of the periodic gap is N ms, wherein N to have a value of 40.

Example 47 may include a UE of any one of Examples 40 to 46 or some other example(s) herein, wherein the controller is further to set up the periodic gap for the first Rx chain in response to the first Rx chain not having a measurement gap and the second Rx chain is used for inter-frequency measurement.

Example 48 may include a UE of any one of Examples 40 to 47 or some other example(s) herein, wherein the controller is further to set up a second measurement gap for the second Rx chain based on the periodic gap of the first Rx chain.

Example 49 may include a UE of any one of Examples 40 to 48 or some other example(s) herein, wherein the controller is further to set up the measurement of the second Rx chain in one or more subframes after the periodic measurement gap.

Example 50 may include a machine-readable medium having instructions, stored thereon, that, when executed cause a UE to a receiver to receive a first measurement gap pattern with a first MGRP for a first receive (Rx) chain of the user equipment (UE) and a second measurement gap pattern with a second MGRP for a second receive (Rx) chain of the UE, wherein the first MGRP is different from the second MGRP; set up the first measurement gap based on the first measurement gap pattern and the first measurement gap based on the second measurement gap pattern, wherein the first measurement gap to have a set of one more gaps that each have a gap length shorter than that of the first measurement gap.

Example 51 may include a machine-readable medium of Example 50, having instructions, stored thereon, that, when executed cause a UE further to set up a first gap in the set of gap at a first subframe and a second gap in the set of gaps at a last subframe of the first measurement gap for carrier aggregation or synchronous dual connectivity.

Example 52 may include a machine-readable medium of any one of Examples 50 and 51 or some other example(s) herein, having instructions stored thereon, that, when executed cause a UE further to set up a first gap in the set of gaps at a subframe of the first Rx chain, wherein the subframe is concurrent with a front boundary of a second measurement gap of the second Rx chain for an arrival time difference between the first Rx chain and the second Rx chain is less than 500 us; and set up a subsequent gap in the set of gaps in a subframe with an index of n+5 or a subframe with an index of n+6 of the first Rx chain, wherein n represents an index of the subframe for the first gap.

Example 53 may include a machine-readable medium of any one of Examples 50 to 52 or some other example(s) herein, that, when executed cause a UE further to set up a first gap in the set of gaps at a subframe of the first Rx chain, wherein the subframe is concurrent with a front boundary of a second measurement gap of the second Rx chain for an arrival time difference between the first Rx chain and the second Rx chain is note less than 500 us; and set up a subsequent gap in the set of gaps in a subframe with an index of n+1 or a subframe with an index of n+5 of the first Rx chain, wherein n represents an index of the subframe for the first gap.

Example 54 may include a machine-readable medium of any one of Examples 50 to 53 or some other example(s) herein, stored thereon, that, when executed cause a UE further to set up a periodic gap for the first Rx chain in response to the first Rx chain not having a measurement gap and the second Rx chain is used for inter-frequency measurement, wherein the first Rx chain is activated; and set up a second measurement gap for the second Rx chain based on the periodic gap of the first Rx chain.

Example 55 may include a machine-readable medium of any one of Examples 50 to 54 or some other example(s) herein, stored thereon, that, when executed cause a UE further to perform the measurement of the second Rx chain in one or more subframes after the periodic measurement gap.

Example 56 may include a machine-readable medium, stored thereon, that, when executed cause an eNB further to configure a first measurement gap pattern with a first measurement gap repetition period (MGRP) for a first receive (Rx) chain of a user equipment (UE); configure a second measurement gap pattern with a second measurement gap repetition period (MGRP) for a second receive (Rx) chain of the UE, wherein the first MGRP is different from the second MGRP; and a transmitter coupled to the controller, to transmit the first measurement gap pattern and the second measurement gap pattern to the UE.

Example 57 may include a machine-readable medium of Example 56 or some other example(s) herein, stored thereon, that, when executed cause an eNB further to configure a first measurement gap of the first Rx chain to include a set of one or more gaps that each have a gap length shorter than that of the first measurement gap.

Example 58 may include a machine-readable medium of any one of Examples 56 and 57 or some other example(s) herein, stored thereon, that, when executed cause an eNB further to configure a gap in the set of gaps to align with a first subframe of the first measurement gap.

Example 59 may include a machine-readable medium of any one of Examples 56 to 58 or some other example(s) herein, stored thereon, that, when executed cause an eNB further to Example 59 may include a machine-readable medium of any one of Examples 56 to 58 or some other example(s) herein, stored thereon, that, when executed cause an eNB further to configure a gap in the set of gap to align with a last subframe of the first measurement gap.

Example 60 may include a machine-readable medium of any one of Examples 56 to 59 or some other example(s) herein, stored thereon, that, when executed cause an eNB further to configure a first measurement gap for the first Rx chain to include a set of one or more gaps based on an arrival time difference between the first Rx chain and the second Rx chain.

Example 61 may include a machine-readable medium of any one of Examples 56 to 60 or some other example(s) herein, stored thereon, that, when executed cause an eNB further to configure a first gap in the set of gaps at a subframe of the first Rx chain, wherein the subframe is concurrent with a front boundary of a second measurement gap of the second Rx chain.

Example 62 may include a machine-readable medium of any one of Examples 56 to 61 or some other example(s) herein, stored thereon, that, when executed cause an eNB further to configure a first gap in the set of gaps at a subframe of the first Rx chain, wherein the subframe is concurrent with a front boundary of a second measurement gap of the second Rx chain to support an asynchronous dual connectivity.

Example 62 may include a machine-readable medium of any one of Examples 56 to 61 or some other example(s) herein, stored thereon, that, when executed cause an eNB further to configure a subsequent gap in the set of gaps in a subframe with an index of n+1 or a subframe with an index of n+5 of the first Rx chain, wherein n represents an index of the subframe for the first gap, in response to the arrival time difference is less than 500 us.

Example 63 may include a machine-readable medium of any one of Examples 56 to 62 or some other example(s) herein, stored thereon, that, when executed cause an eNB further to configure a subsequent gap in the set of gaps in a subframe with an index of n+5 or a subframe with an index of n+6 of the first Rx chain, wherein n represents an index of the subframe for the first gap, in response to the arrival time difference is not less than 500 us.

Example 64 may include a machine-readable medium of any one of Examples 56 to 63 or some other example(s) herein, stored thereon, that, when executed cause an eNB further to configure a periodic gap for the first Rx chain, wherein a periodicity of the periodic gap is N ms, wherein N to have a value more than 5.

Example 65 may include a machine-readable medium of any one of Examples 56 to 64 or some other example(s) herein, stored thereon, that, when executed cause an eNB further to configure the periodic gap for the first Rx chain in response to the first Rx chain not having a measurement gap and the second Rx chain is used for inter-frequency measurement.

Example 66 may include a machine-readable medium of any one of Examples 56 to 65 or some other example(s) herein, stored thereon, that, when executed cause an eNB further to configure a second measurement gap for the second Rx chain based on the periodic gap of the first Rx chain.

Example 67 may include a machine-readable medium of any one of Examples 56 to 66 or some other example(s) herein, stored thereon, that, when executed cause an eNB further to configure the measurement of the second Rx chain in one or more subframes after the periodic measurement gap.

Example 68 may comprise a non-transitory machine-readable medium having instructions, stored thereon, that, when executed cause an electronic device to perform one or more elements of a method or a UE or eNB described in or related to any of examples 1-67 and/or any other examples described herein.

Example 69 may include one or more non-transitory computer-readable media comprising instructions to cause an electronic device, upon execution of the instructions by one or more processors of the electronic device, to perform one or more elements of a method or a UE or eNB described in or related to any of examples 1-67 and/or any other process described herein.

Example 70 may include an apparatus comprising control circuitry, transmit circuitry, and/or receive circuitry to perform one or more elements of a UE or an eNB described in or related to any of examples 1-67 and/or any other embodiments described herein.

Example 71 may include a method of communicating in a wireless network as shown and described herein and/or comprising one or more elements of a method, a UE or an eNB described in or related to any of examples 1-67 and/or any other method or process described herein.

Example 72 may include a wireless communication system as shown and described herein and/or comprising one or more elements of a UE or an eNB described in or related to any of examples 1-67 and/or any other embodiments described herein.

Example 73 may include a wireless communication device as shown and described herein and/or comprising one or more elements of a UE or an eNB described in or related to any of examples 1-67 and/or any other embodiments described herein.

It should be understood that many of the functional units described in this specification have been labeled as modules or units, in order to more particularly emphasize their implementation independence. For example, a module or unit may be implemented as a hardware circuit comprising custom VLSI circuits or gate arrays, off-the-shelf semiconductors such as logic chips, transistors, or other discrete components. A module or unit may also be implemented in programmable hardware devices such as field programmable gate arrays, programmable array logic, programmable logic devices or the like.

Modules or units may also be implemented in software for execution by various types of processors. An identified module or unit of executable code may, for instance, comprise one or more physical or logical blocks of computer instructions, which may, for instance, be organized as an object, procedure, or function. Nevertheless, the executable code of an identified module or unit need not be physically located together, but may comprise disparate instructions stored in different locations which, when joined logically together, comprise the module or unit and achieve the stated purpose for the module or unit.

A module or unit of executable code may be a single instruction, or many instructions, and may even be distributed over several different code segments, among different programs, and across several memory devices. Similarly, operational data may be identified and illustrated herein within modules or units, and may be embodied in any suitable form and organized within any suitable type of data structure. The operational data may be collected as a single data set, or may be distributed over different locations including over different storage devices, and may exist, at least partially, merely as electronic signals on a system or network. The modules or units may be passive or active, including agents operable to perform desired functions.

Reference throughout this specification to "an example" means that a particular feature, structure, or characteristic described in connection with the example is included in at least one embodiment of the present disclosure. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as an equivalent of any other member of the same list solely based on their presentation in a common group without indications to the contrary. In addition, various embodiments and example of the present disclosure may be referred to herein along with alternatives for the various components thereof. It is understood that such embodiments, examples, and alternatives are not to be construed as equivalents of one another, but are to be considered as separate and autonomous representations of the present disclosure.

Furthermore, the described features, structures, or characteristics may be combined in any suitable manner in one or more embodiments. In the following description, numerous specific details are provided, such as examples of search spaces, to provide a thorough understanding of embodiments of the disclosure. One skilled in the relevant art will recognize, however, that the disclosure may be practiced without one or more of the specific details, or with other methods, components, materials, etc. In other instances, well-known structures, materials, or operations are not shown or described in detail to avoid obscuring aspects of the disclosure.

While the forgoing examples are illustrative of the principles of the present disclosure in one or more particular applications, it will be apparent to those of ordinary skill in the art that numerous modifications in form, usage and details of implementation may be made without the exercise of inventive faculty, and without departing from the principles and concepts of the disclosure. Accordingly, it is not intended that the disclosure be limited, except as by the claims set forth below.

While the methods of FIGS. 7-11 is illustrated to comprise a sequence of processes, the methods in some embodiments may perform illustrated processes in a different order.

While certain features of the disclosure have been described with reference to embodiments, the description is not intended to be construed in a limiting sense. Various modifications of the embodiments, as well as other embodiments of the disclosure, which are apparent to persons skilled in the art to which the disclosure pertains are deemed to lie within the spirit and scope of the disclosure.

What is claimed is:

1. An apparatus of a base station, comprising:
a controller to:
configure a first measurement gap pattern with a first measurement gap repetition period (MGRP) for a first receive (Rx) chain of a user equipment (UE);
configure one or more gaps in addition to measurement gaps of the first measurement gap pattern for the first Rx chain; and
configure a second measurement gap pattern with a second MGRP for a second Rx chain of the UE, wherein the first MGRP is different from the second MGRP; and
a transmitter, coupled to the controller, to transmit the first measurement gap pattern and the second measurement gap pattern to the UE.

2. The apparatus of the base station of claim 1, wherein individual measurement gaps of the one or more gaps each have a gap length shorter than a gap length of measurement gaps of the first measurement gap pattern.

3. The apparatus of the base station of claim 2, wherein a measurement gap of the first measurement gap pattern is to start or end in a first subframe having an index and the controller is further to: configure a first measurement gap of the one or more gaps within a second subframe having the index.

4. The apparatus of the base station of claim 1 wherein the one or more gaps include a plurality of measurement gaps between consecutive measurement gaps of the first measurement gap pattern.

5. The apparatus of the base station of claim 1, wherein the controller is further to: configure the one or more gaps based on an arrival time difference between the first Rx chain and the second Rx chain.

6. The apparatus of the base station of claim 5, wherein the controller is further to: configure a first measurement gap of the one or more gaps in a first subframe of the first Rx chain, wherein the first subframe is concurrent with a front boundary of a measurement gap of the second Rx chain.

7. The apparatus of the base station of claim 6, wherein the controller is to configure the first measurement gap to support asynchronous dual connectivity.

8. The apparatus of the base station of claim 6, wherein the controller is further to: configure a second measurement gap in the one or more gaps in a second subframe with an index of n+1 or n+5 of the first Rx chain, wherein n represents an index of the first subframe, in response to the arrival time difference being less than 500 us.

9. The apparatus of the base station of claim 6, wherein the controller is further to: configure a second measurement gap in the one or more gaps in a second subframe with an index of n+5 or n+6 of the first Rx chain, wherein n represents an index of the first subframe, in response to the arrival time difference being not less than 500 us.

10. The apparatus of the base station of claim 1, wherein the controller is further to: configure the one or more gaps with a periodic gap having a periodicity of N ms, wherein N is to have a value more than 5.

11. The apparatus of the base station of claim 10, wherein the controller is further to: configure a second measurement gap for the second Rx chain based on the periodic gap of the first Rx chain.

12. The apparatus of the base station of claim 11, wherein the controller is further to: configure a measurement of the second Rx chain in one or more subframes after the periodic gap.

13. The apparatus of the base station of claim 1, wherein the controller is further to: configure the one or more gaps with a periodic gap having a periodicity of N ms, wherein N is to have a value of 40.

14. The apparatus of the base station of claim 1, wherein the controller is further to: configure a second measurement gap for the second Rx chain based on a periodic gap of the first Rx chain.

15. The apparatus of the base station of claim 14, wherein the controller is further to: configure measurement of the second Rx chain in one or more subframes after the periodic gap.

16. A user equipment (UE), comprising:
a receiver to receive configuration information to configure a first measurement gap pattern with a first MGRP for a first receive (Rx) chain of the UE; a short-gap pattern for one or more gaps in addition to measurement gaps of the first measurement gap pattern for the first Rx chain; and a second measurement gap pattern with a second MGRP for a second receive (Rx) chain of the UE, wherein the first MGRP is different from the second MGRP; and
a controller to set up measurement gaps based on the first measurement gap pattern, the short-gap pattern, and the second measurement gap pattern.

17. The UE of claim 16, wherein individual measurement gaps of the short-gap pattern each have a gap length shorter than the measurement gaps of the first measurement gap pattern.

18. The UE of claim 17, wherein the controller is further to: set up a first measurement gap of the first measurement gap pattern to start or end in a first subframe having a first index: and set up a first measurement gap of the short-gap pattern within a second subframe having the first index.

19. The UE of claim 18, wherein the controller is further to: set up the first measurement gap of the first measurement gap pattern to start in the first subframe; set up a second measurement gap pattern of the first measurement gap pattern to end in a third subframe having a second index; and set up a second measurement gap of the short-gap pattern within a fourth subframe having the second index.

20. The UE of claim 16, wherein the controller is further to: set the measurement gaps based on an arrival time difference between the first Rx chain and the second Rx chain.

21. The UE of claim 16, wherein the controller is further to: configure a first measurement gap of the short-gap pattern in a subframe of the first Rx chain, wherein the subframe is concurrent with a front boundary of a second measurement gap of the second Rx chain.

22. The UE of claim 20, wherein the controller is further to: set up a first measurement gap of the short-gap pattern in a first subframe of the first Rx chain, wherein the subframe is concurrent with a front boundary of a second measurement gap of the second Rx chain to support an asynchronous dual connectivity.

23. The UE of claim 22, wherein the controller is further to: set up a subsequent measurement gap of the short-gap pattern in a second subframe with an index of n+1 or n+5 of the first Rx chain, wherein n represents an index of the first subframe, in response to the arrival time difference being less than 500 us.

* * * * *